J. E. LEONARD.
ADJUSTABLE IRIS AND CURTAIN FOR CAMERAS.
APPLICATION FILED DEC. 4, 1919.

1,396,717.

Patented Nov. 8, 1921.

INVENTOR.
JOHN E. LEONARD.
BY Hazard & Miller
ATTORNEYS.

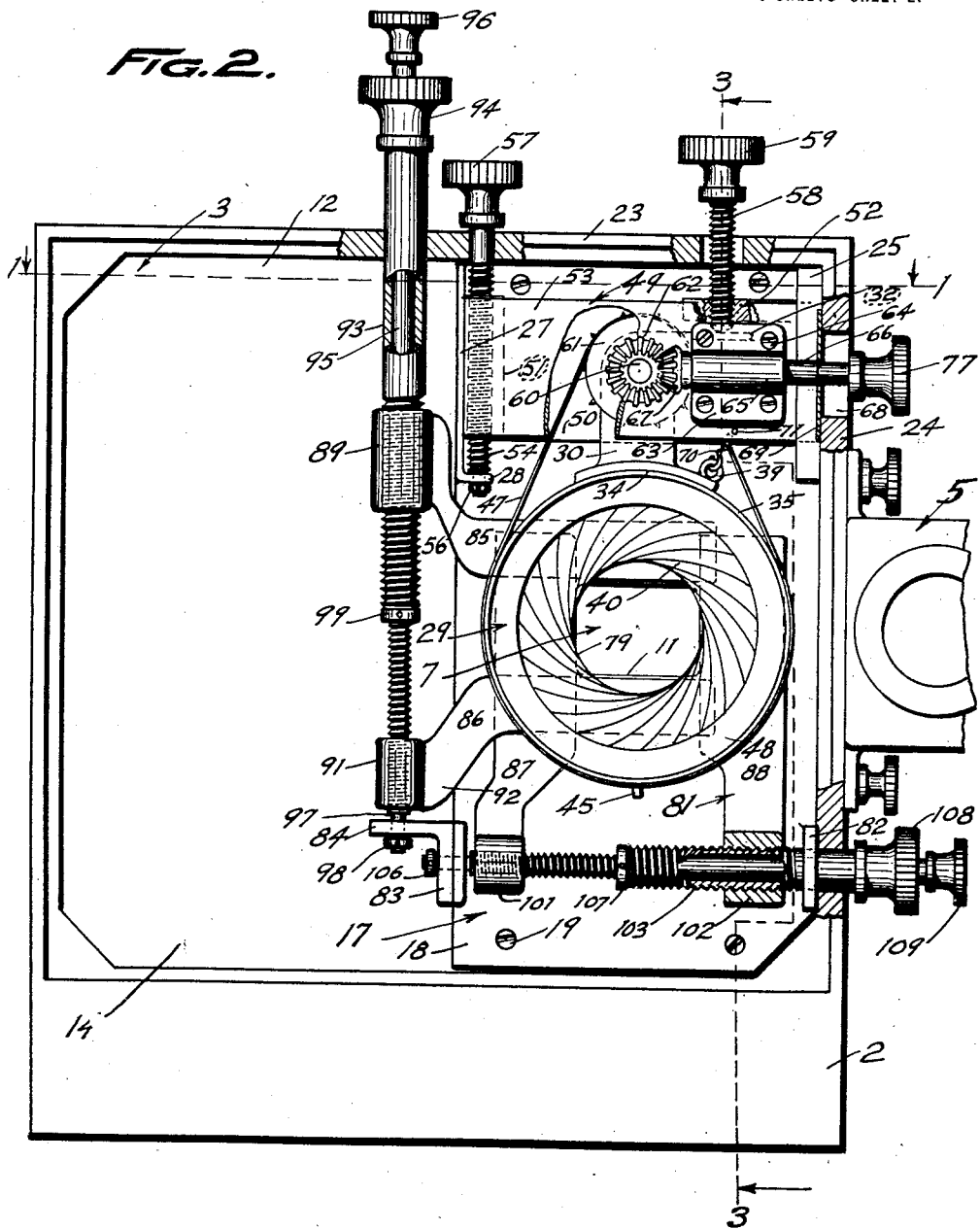

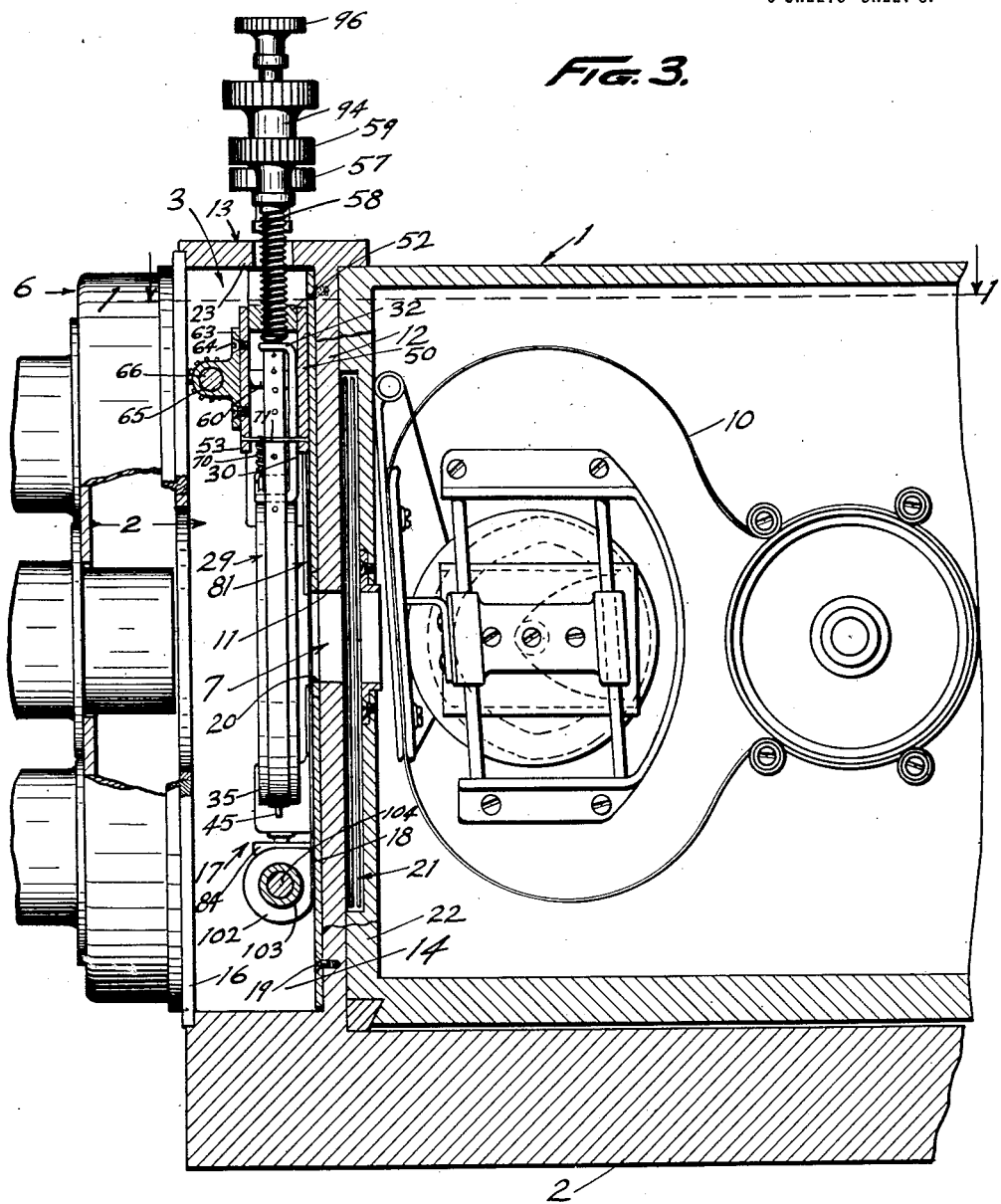

J. E. LEONARD.
ADJUSTABLE IRIS AND CURTAIN FOR CAMERAS.
APPLICATION FILED DEC. 4, 1919.
1,396,717.
Patented Nov. 8, 1921.
6 SHEETS—SHEET 4.
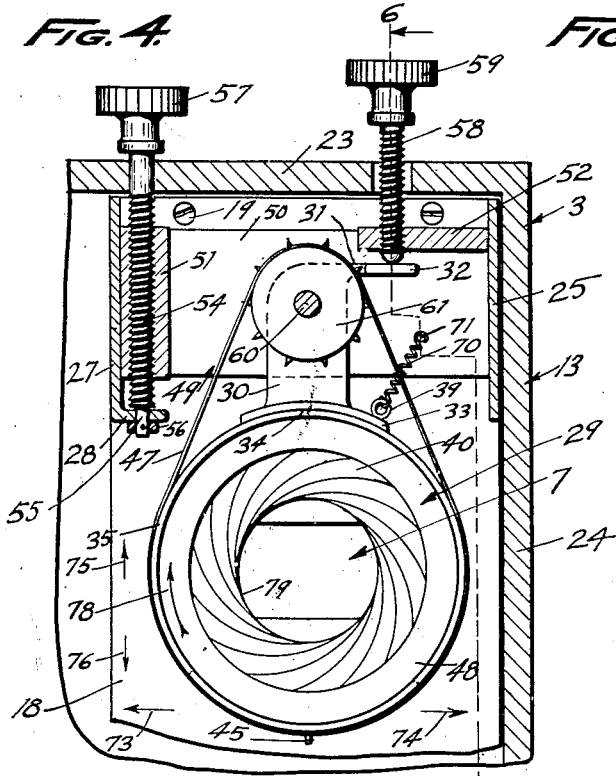
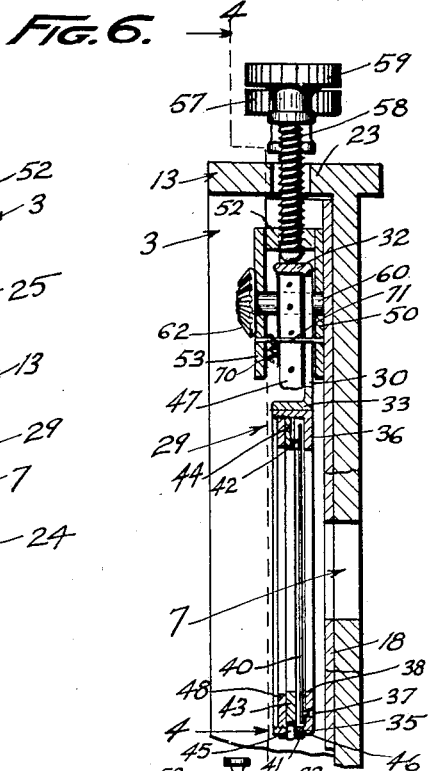
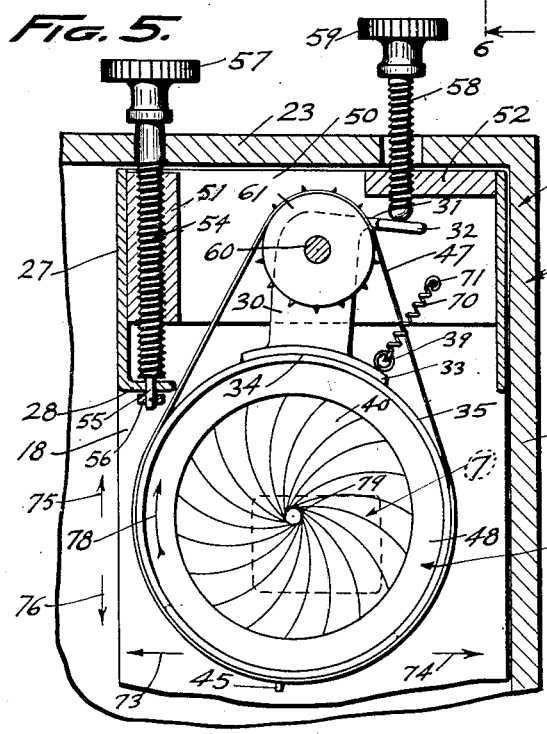
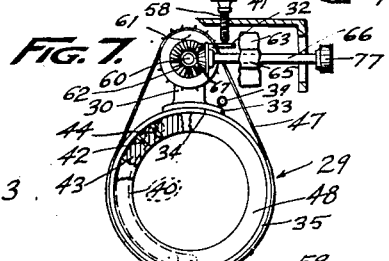
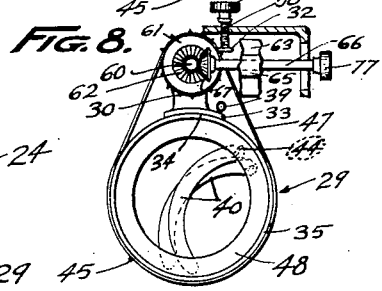
INVENTOR.
JOHN E. LEONARD.
BY Hazard & Miller
ATTORNEYS.

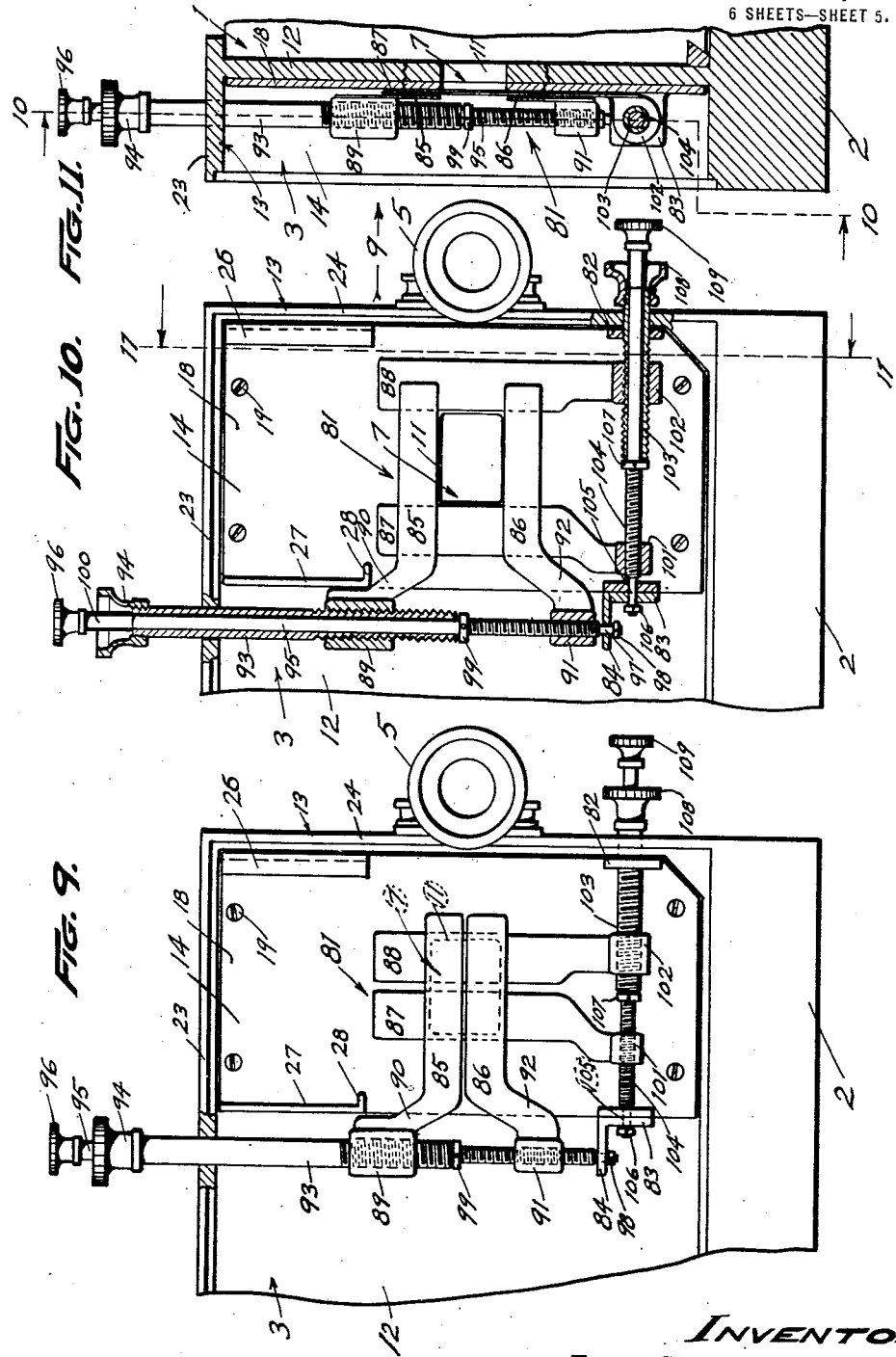

J. E. LEONARD.
ADJUSTABLE IRIS AND CURTAIN FOR CAMERAS.
APPLICATION FILED DEC. 4, 1919.
1,396,717.
Patented Nov. 8, 1921.
6 SHEETS—SHEET 6.
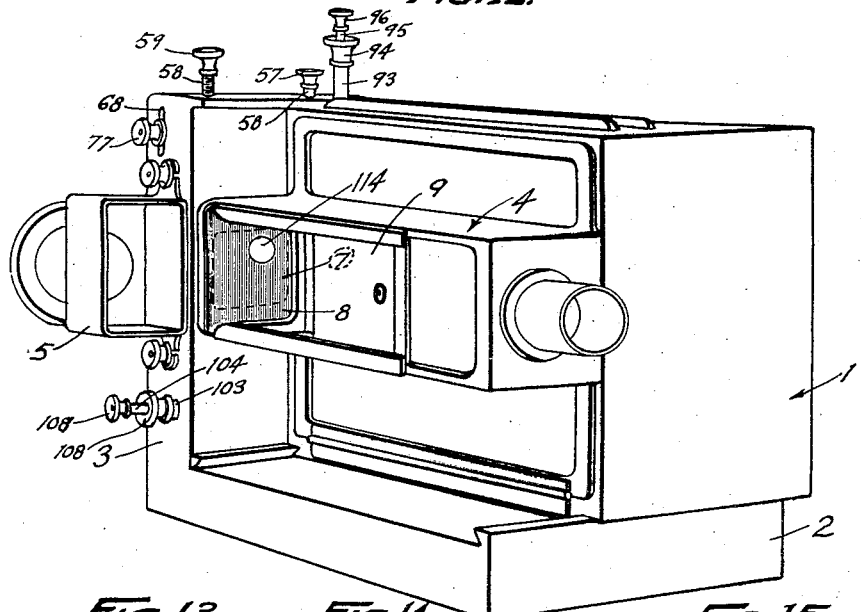
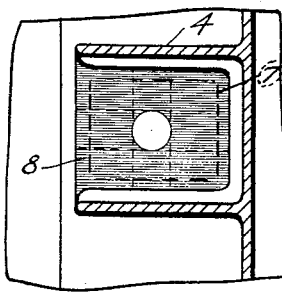
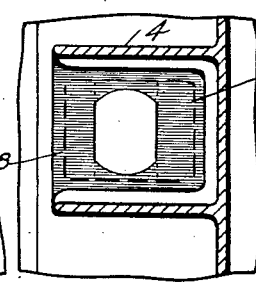
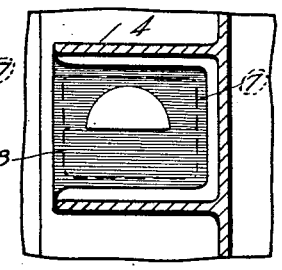
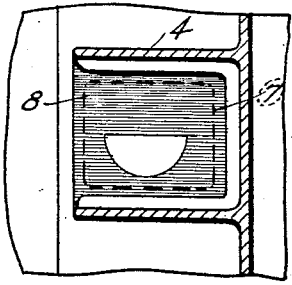
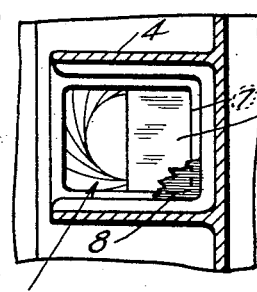
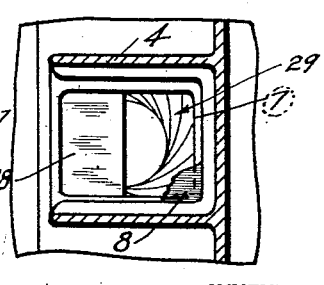
INVENTOR.
John E. Leonard.
BY
Hazard & Miller
ATTORNEYS.

UNITED STATES PATENT OFFICE.

JOHN E. LEONARD, OF LOS ANGELES, CALIFORNIA, ASSIGNOR, BY MESNE ASSIGNMENTS, TO MITCHELL CAMERA CO., A CORPORATION.

ADJUSTABLE IRIS AND CURTAIN FOR CAMERAS.

1,396,717.    Specification of Letters Patent.    Patented Nov. 8, 1921.

Application filed December 4, 1919. Serial No. 342,513.

*To all whom it may concern:*

Be it known that I, JOHN E. LEONARD, a citizen of the United States, residing at Los Angeles, in the county of Los Angeles and State of California, have invented new and useful Improvements in Adjustable Iris and Curtains for Cameras, of which the following is a specification.

My invention relates to moving picture cameras and consists of the novel features herein shown, described and claimed.

My object is to mount an adjustable iris in combination with an adjustable curtain forming elements in a camera in front of an exposure aperture and behind the photographing lens and provide means for operating the iris and the curtain from outside of the casing.

Fig. 2 is a fragmentary front elevation with the lens magazine removed to show the adjustable iris and the adjustable curtain forming elements, the view being taken looking in the direction indicated by the arrows 2 in Figs. 1 and 3.

Fig. 3 is a fragmentary vertical sectional detail longitudinally of the axis and on the line 3—3 of Fig. 1 and looking in the direction indicated by the arrows.

Fig. 4 is a fragmentary sectional detail on a plane parallel with Fig. 2 with the curtain construction omitted and the view being taken on the line 4—4 of Fig. 6 and looking in the direction indicated by the arrows and showing the iris.

Fig. 5 is a view analogous to Fig. 4 and showing the parts in a different position.

Fig. 6 is a vertical cross section on the line 6—6 of Fig. 4 and looking in the d rection indicated by the arrows.

Fig. 7 is a fragmentary view on the same plane as Fig. 2 with the curtain construction omitted and showing upon a reduced scale the mechanism for operating the iris.

Fig. 8 is a view analogous to Fig. 7 and still further showing the operation of the iris.

Fig. 9 is a view on the same plane as Fig. 2 with the iris construction omitted and showing the curtain forming mechanism in front elevation, the view being taken looking in the direction indicated by the arrow 9 in Fig. 11.

Fig. 10 is a sectional elevation on a plane parallel with Fig. 9 and on the line 10—10 of Fig. 11 and looking in the direction indicated by the arrows.

Fig. 11 is a vertical cross section on the line 11—11 of Fig. 10.

Fig. 12 is a perspective of a camera having a finder along side the camera box and showing the camera box shifted to bring the finder into line with the exposure aperture and illustrating the operation of the adjustable iris and the adjustable curtain by showing its effect upon the ground glass screen in the finder.

Fig. 13 is a vertical cross section behind the ground glass screen in Fig. 12 and showing the iris and curtain shifted to register in a different position upon the ground glass screen.

Figs. 14, 15, 16, 17 and 18 are views analogous to Fig. 13 and still further illustrating the operation of the iris and curtain through the exposure aperture.

Figure 1:
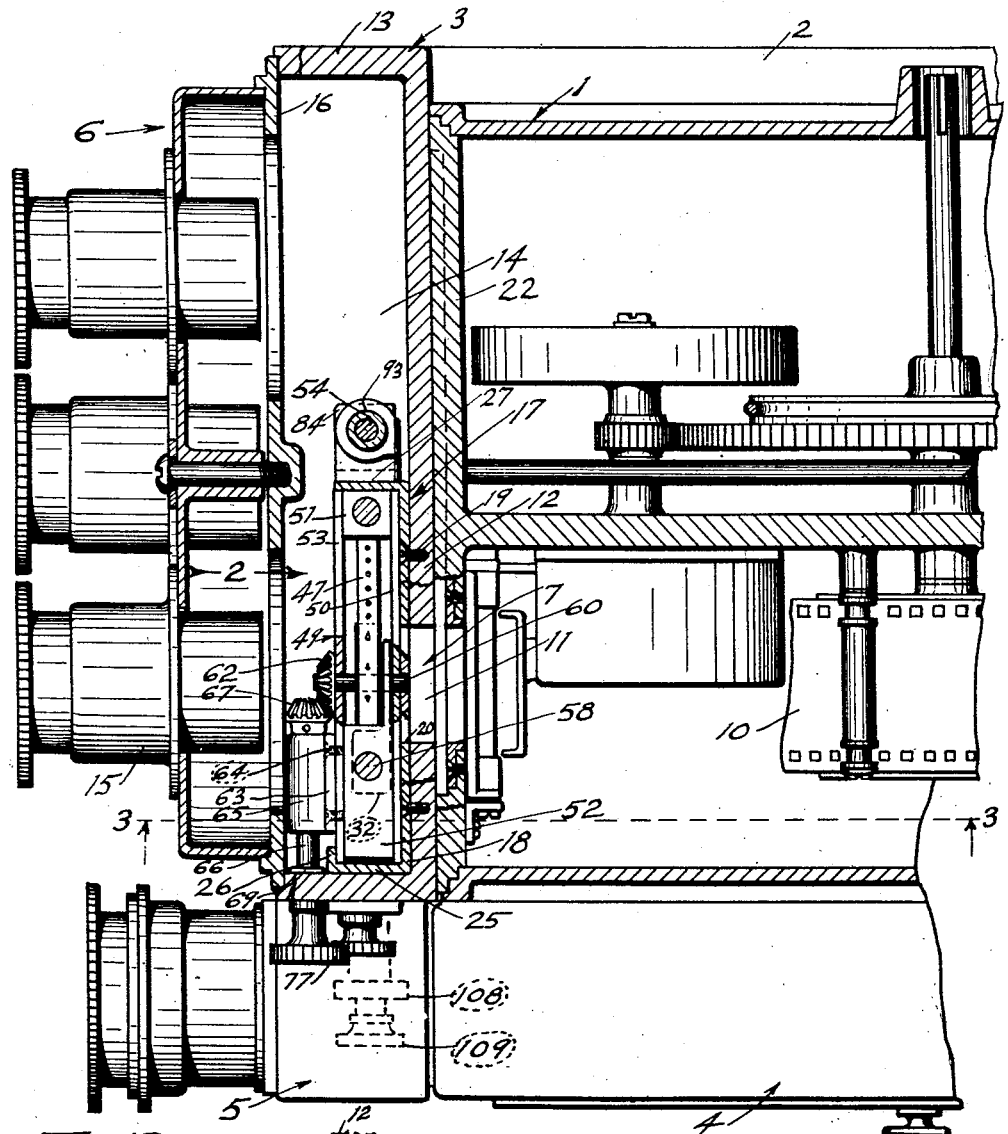
Figure 1 is a fragmentary horizontal section on the lines 1—1 of Figs. 2 and 3 and looking downwardly as indicated by the arrows.

Referring to Figs. 1, 3 and 12, the camera box 1 is mounted to slide transversely upon the base 2. The casing 3 is formed rigid with the base 2 and extends upwardly in front of the camera box 1. The movable portion 4 of the finder is built integral with the camera box 1 and the lens portion 5 of the finder is built upon the casing 3. The photographing lens magazine 6 is mounted upon the front face of the casing 3. When the camera box 1 is moved laterally upon the base 2 the portion 4 of the finder is brought into registration with the exposure aperture 7 and with the photographing lens operating in line with the exposure aperture 7.

The screen 8 of ground glass or ground celluloid is mounted in the front end of the finder 4 to fit behind the exposure aperture 7. The sliding door 9 is formed in the uter side of the finder so that the door may be opened and the screen 8 viewed from the rear side to assist in adjusting the iris and curtain and to see the result upon the screen 8.

When the camera box 1 is in photographing position as in Fig. 1, the film 10 is behind the exposure aperture 7 and the exposure aperture 7 is in line with the aperture 11 through the rear wall 12 of the casing 3. A flange 13 extends forwardly from the edges of the rear wall 12 all the way around thus producing the chamber 14 in front of the wall 12 and back of the photographing lens 15. The photographing lens magazine 6 is mounted upon a supporting plate 16 and the supporting plate 16 fits against the flange 13 parallel with the rear wall 12 and forms the front wall of the chamber 14.

The details of the curtain forming elements and iris mounting 17 are shown in Figs. 1, 2 and 3. The attaching plate 18 fits against the front face of the wall 12 and is secured in place by screws 19 inserted through the plate 18 and tapped into the wall 12. The plate 18 has an opening 20 in line with the exposure apertures 11 and 7 and the shutter mechanism 21 is mounted in a recess in the front wall 22 of the camera box 1. The attaching plate 18 is rectangular in front elevation and fits against the top portion 23 of the flange 13 and against the side portion 24 of the flange 13. A slideway flange 25 extends forwardly from the edge of the plate 18 along the inner face of the portion 24 of the casing and the lip 26 extends inwardly from the flange 25 parallel with the plate 18. The second slideway flange 27 extends forwardly from the opposite edge of the plate 18 from the flange 25 and parallel with the flange 25. The flanges 25 and 27 and the lip 26 extend from the upper edge of the plate downwardly about one-third of the distance to the bottom. A bearing 28 extends inwardly from the lower end of the flange 27.

The details of the adjustable iris 29 are shown in Figs. 4, 5, 6, 7 and 8. The pivot supporting arm 30 is flat and of considerable width in front elevation and comparatively thin in side elevation. A pivot hole is formed through the arm 30 near its upper end. The tilting lever 31 extends from the upper end of the arm 30 and above the pivot hole and at right angles. Normally the supporting arm 30 is horizontal. The adjusting screw plate 32 extends forwardly from the free end of the tilting arm 31. An attaching plate 33 is formed integral with the lower end of the arm 30 and has a curved lower face 34. The housing ring 35 fits against the face 34 and is soldered in place. The annular supporting flange 36 extends inwardly from the back edge of the housing ring 35 and forms the frame around the iris opening when the iris opening is expanded to its full extent. Pivot pin holes 37 are formed through the flange 36 near to the housing ring 35 and some distance from the inner edge 38. A screw eye 39 is tapped into the attaching plate 33.

The leaves 40 are thin flat plates and extend through about one-third of a circle. Pivot pins 41 are fixed in the leaves 40 and extend into the pivot holes 37. Usually there are about thirty leaves 40 in an iris and the pin holes 37 are evenly spaced apart entirely around the circle. Cam pins 42 are fixed in the opposite ends of the leaves 40 from the pivot pins 41. The flange 36 is laid horizontally with the housing ring 35 extending upwardly and the leaves 40 are placed in position with the pivot pins 41 in the pin holes 37 and the cam pins 42 projecting upwardly.

The cam ring 43 is flat and substantially the same size as the flange 36 and fits loosely within the housing ring 35. Cam slots 44 are formed in the rear face of the cam ring 43, said slots being evenly spaced apart and extending radially across the cam ring. The cam ring 43 is placed in position with the slots downwardly and the cam pins 42 are arranged in the proper cam slots 44. A stud 45 extends radially from the periphery of the cam ring 43 through an extended slot 46 formed in the housing ring 35 and the stud 45 extends through the center of the sheet metal operating belt 47, so that when the belt 47 is pulled one way the cam ring 43 is moved one way to open the iris, and when the belt is pulled the other way the cam ring 43 is operated the other way to close the iris. The retaining ring 48 is screwed into the housing ring 35 against the cam ring 43 and adjusted so that the cam ring 43 will move freely to move the leaves 40 to their extreme open positions and to move the leaves 40 to produce a very small central opening.

Referring to Figs. 1, 2, 3, 4, 5 and 6, the slide 49 comprises a back plate 50 blocks 51 and 52 soldered to the back plate and a front plate 53 soldered to the blocks. A screw 54 is tapped through the block 51 and has a pintle 55 extending through the bearing 28 and a stop 56 upon the lower end of the pintle so as to hold the screw 54 from endwise movement and allow the screw to rotate. The screw 54 extends upwardly loosely through the flange 13 and has a hand wheel 57 upon its upper end so that by manipulating the hand wheel the slide 49 may be raised or lowered. A screw 58 is inserted downwardly loosely through the flange 13 and tapped through the block 52 and has a hand wheel 59 upon its upper end for operating the screw.

The shaft 60 is mounted through the plate 53, through the opening in the supporting arm 30 and through the plate 50. A sprocket 61 is fixed upon the shaft 60 just in front of the arm 30. The arm 30 swings freely upon the shaft and the sprocket is tight and non-rotatable upon the shaft. The sheet metal belt 47 runs around the sprocket 61.

A bevel pinion 62 is fixed upon the forward end of the shaft 60 in front of the plate 53. A plate 63 is secured to the front face of the plate 53 by screws 64. The bearing 65 is formed integral with the plate 63. A shaft 66 is mounted in the bearing 65 and has a bevel pinion 67 fixed upon its inner end and meshing with the pinion 62. The shaft 66 extends through a vertical elongated slot 68 in the vertical portion of the flange 13 and a shutter 69 is mounted upon the shaft against the inner face of the flange 13 to cover the opening, so that the shaft 66 may go up and down with the slide 49 by manipulating the hand wheel 57.

The adjusting screw plate 32 fits upwardly against the screw 58. A retractile coil spring 70 connects the screw eye 39 to a pin 71 extending through the plates 53 and 50, the tension of the spring 70 being exerted to hold the adjusting screw plate 32 against the screw 58, so that when the hand wheel 59 is manipulated to operate the screw 58 downwardly the screw 58 presses upon the adjusting screw plate 32 and overcomes the tension of the spring 70 and swings the iris 29 in the direction indicated by the arrow 73, and so that when the hand wheel 59 is manipulated in the opposite direction to withdraw the screw 58 the tension of the spring 70 will swing the iris in the direction indicated by the arrow 74.

When the hand wheel 57 is manipulated clockwise the iris 29 will be moved vertically in the direction indicated by the arrow 75, and when the hand wheel 57 is operated in the reverse direction the iris will be moved vertically in the direction indicated by the arrow 76.

A hand wheel 77 is fixed upon the outer end of the shaft 66 and when the hand wheel 77 is operated clockwise the belt 47 will be pulled to rotate the cam ring 43 in the direction indicated by the arrow 78 thereby moving the free ends of the leaves 40 to reduce the size of the iris opening 79, and when the hand wheel 77 is rotated in the opposite direction the belt 47 will be pulled to move the cam ring 43 in the direction indicated by the arrow 80 thereby moving the free ends of the leaves 40 to enlarge the opening 79.

The details of the adjustable curtain forming members 81 are shown in Figs. 2, 3, 9, 10 and 11. A bearing bracket 82 extends forwardly from the lower outside corner of the plate 18. A similar bearing bracket 83 extends forwardly from the opposite corner, said brackets 82 and 83 being in horizontal alinement. A bearing bracket 84 is formed by securing an angle plate against the side of the bearing bracket 83. The bearing in the bracket 84 is vertical.

The curtain forming members 85, 86, 87 and 88 are thin plates. The plates 87 and 88 fit closely against the front face of the mounting 17 and the plates 85 and 86 fit closely against the front faces of the plates 87 and 88. An internally screw-threaded bearing 89 is secured to the arm 90 extending from the outer end of the plate 85 so as to offset the bearing 89 upwardly relative to the body of the plate. In a like manner an internally screw-threaded bearing 91 is rigidly connected to the arm 92 extending outwardly and downwardly from the plate 86 so as to offset the bearing 91 relative to the body of the plate. An adjusting screw 93 is screw-seated through the bearing 89 and extends outwardly through the flange 33 and has a hand wheel 94 upon its outer end. The screw 93 is tubular.

A second adjusting screw 95 is mounted loosely through the screw 93 and is screw-seated through the bearing 91, there being a second hand wheel 96 outside of the hand wheel 94 for operating the screw 95. The screw 95 has a pintle 97 extending through the bearing 84 and a stop 98 upon the lower end of the pintle, so that the screw is swiveled in the bearing 84 to rotate freely and held against endwise movement.

A stop collar 99 is fixed upon the screw 95 substantially in line with the horizontal center of the exposure aperture 7 and the screw 93 works against this stop collar 99. The hub 100 of the hand wheel 96 engages the hub of the hand wheel 94 to hold the screw 93 from moving upwardly on the screw 95. Manipulating the hand wheels 94 and 96 will move the curtain members 85 and 86 to or from each other to the extent that the curtain forming members 85 and 86 may be moved together to cover the exposure aperture 7 and move the part to any desired extent to uncover the exposure aperture.

Screw-threaded bearings 101 and 102 are made rigid with the curtain forming members 87 and 88. A third adjusting screw 103 is mounted loosely through the flange 33 and loosely through the bearing 82 and screw-seated through the bearing 102. The screw 103 is tubular. The fourth adjusting screw 104 is mounted loosely through the screw 103 and screw-seated through the bearing 101. The screw 104 has a pintle 105 fitting rotatably in the bearing 83 and a stop 106 on the outer end of the pintle against the bearing 83 so as to hold the screw 104 from endwise movement.

A stop 107 is fixed upon the screw 104 substantially in vertical alinement with the plane of the center of the exposure aperture 7. The screw 104 works against the stop 107. A hand wheel 108 is fixed upon the outer end of the screw 103. A hand wheel 109 is fixed upon the outer end of the screw 104. The hand wheel 109 engages the hand wheel 108 to hold the screw 103 from moving endwise on the screw 104. The hand wheels 108 and 109 are outside of the casing 3 and manipulation of the hand wheels 108 and 109 will move the curtain members 87 and 88 to and from each other to any extent so as to cover and uncover the exposure aperture 7.

In Fig. 9 the curtain 81 thus produced is closed so as to completely cover the exposure aperture 7 by bringing the plates 85 and 86 together one way and the plates 87 and 88 together the other way. In Fig. 10 the curtain is wide open so as not to obstruct or interfere with the exposure aperture 7.

In Figs. 3 and 11 it is shown that the curtain forming members 87 and 88 fit tight against the face of the mounting 17, and that the curtain forming members 85 and 86 fit tight against the faces of the members 87 and 88, and that the bearings 101 and 102 are offset forwardly from the curtain forming members 87 and 88, and that the bearings 89 and 91 are offset forwardly from the curtain forming members 85 and 86, and that the curtain 81 thus produced is as near as may be to the exposure aperture 7 and between the exposure aperture 7 and the photographing lens.

In Figs. 2 and 3 it is shown that the adjustable curtain 81 is immediately behind the iris 29. The iris opening is circular and the curtain opening 111 is rectangular, and the principal object of using the adjustable iris 29 in combination with the adjustable curtain 81 is to modify the openings 79 and 111 each by the other so as to produce irregular forms.

Figure 19:
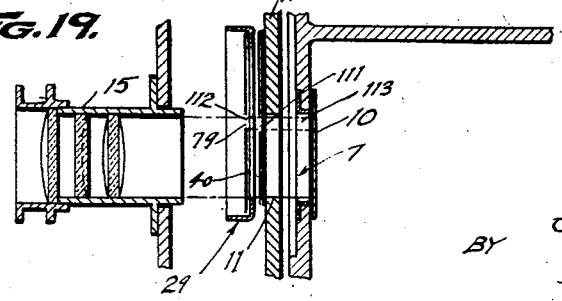
Fig. 19 is a diagrammatic sectional detail through the photographing lens, the adjustable iris, the adjustable curtain, the exposure aperture, and the film behind the exposure aperture.

Referring to Fig. 19, the curtain opening 111 is in front of the exposed film 10 and the iris opening 79 is in front of the curtain opening 111, and the openings 79 and 111 are back of the photographing lens construction 15, and the light passing through the photographing lens construction 15 will all be obstructed by the iris 29 except the shaft of light 112 which passes through the opening 79, and this shaft of light will strike the curtain 81 and will all be obstructed except the shaft of light 113 which passes through the opening 111 and this shaft of light 113 will strike the film 10 and register upon the film when the camera is in photographing position.

Referring to Fig. 12. In order to adjust the shaft of light 113 to the proper form and to the proper place within the exposure aperture 7 the camera box 1 is moved laterally to bring the finder 4 into registration with the exposure aperture 7 and then the spot 114 upon the screen 8 may be viewed through the finder and the iris and curtain adjusted to suit.

In Fig. 12 the spot 114 is circular showing that the opening 111 through the curtain is larger all the way around than the opening 110 through the iris, and the spot 114 is in the upper right-hand quarter of the exposure aperture 7.

In Fig. 13 the iris and curtain have been adjusted to bring the spot 114 to the center of the aperture.

In Fig. 14 the iris and curtain have been adjusted to make the spot 114 straight sided vertically and round sides on the top and bottom.

In Fig. 15 the iris and curtain have been adjusted to make the spot half round and above the center.

In Fig. 16 the adjustment may be reversed to make the spot half round and below the center.

In Figs. 17 and 18 the spots are half round, one being right-handed and the other left-handed.

In this way any desired form of spot may be produced within the exposure aperture 7 upon the screen 8, and when the camera box 1 is brought into registration with the photographing lens and the photographing operation proceeds the spot thus produced will register upon the film and by proper manipulation the spot may be caused to fade in or fade out.

In a companion application, filed Nov. 7, 1919, Serial # 336,393, I have shown, described and claimed the adjustable iris *per se* and do not wish to make such claims herein.

In another companion application, filed November 7, 1919, Serial # 336,394, I have shown, described and claimed the adjustable curtain *per se* and do not wish to make such claims herein.

Various changes may be made without departing from the spirit of my invention as claimed.

I claim:

1. A camera having an iris and a plurality of curtain forming elements interposed between the photographing lens and the exposure aperture.

2. A camera having an iris and a plurality of curtain forming elements interposed between the photographing lens and the exposure aperture, means for moving the curtain forming elements relatively to the said aperture, and means for raising and lowering the iris.

3. A camera having an iris and a plurality of curtain forming elements interposed between the photographing lens and the exposure aperture, means for moving the curtain forming elements, relatively to the said aperture and means for moving the iris laterally.

4. A camera having an iris and a plurality of curtain forming elements interposed between the photographing lens and the exposure aperture, means for moving the curtain forming elements relative to said aperture and means for moving the iris to register at any desired point in the exposure aperture.

5. A camera having an iris and a plurality of curtain forming elements interposed between the photographing lens and the exposure aperture, means for moving the iris relatively to said aperture and means for raising and lowering the curtain forming elements.

6. A camera having an iris and a plurality of curtain forming elements interposed between the photographing lens and the exposure aperture, means for moving the iris relatively to said aperture and means for moving the curtain forming elements laterally.

7. A camera having an iris and a plurality of curtain forming elements interposed between the photographing lens and the exposure aperture, means for moving the iris relatively to said aperture and means for moving the curtain forming elements to cause the opening made thereby to register at any desired point in the exposure aperture.

8. A camera having an iris and a plurality of curtain forming elements interposed between the photographing lens and the exposure aperture, and means for adjusting the iris and the curtain forming elements to produce a composite opening.

9. A camera having an iris and a plurality of curtain forming elements interposed between the photographing lens and the exposure aperture, and inside of the camera case, means operable, from outside of the camera case for adjusting the iris and the curtain forming elements to produce a composite opening therethrough.

10. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, and an adjustable iris and a plurality of adjustable curtain forming elements in the casing between the photographing lens and the exposure aperture and having means operable from outside of the camera case for adjusting said iris and curtain forming elements so as to produce a composite opening at any desired point in the exposure aperture.

11. A camera having an iris and a plurality of curtain forming elements interposed between the photographing lens and the exposure aperture and inside of the camera case, means operable from outside of the camera case for adjusting the iris and the curtain forming elements to produce a composite opening therethrough, and causing said composite opening to register at any desired point in the exposure aperture.

In testimony whereof I have signed my name to this specification.

JOHN E. LEONARD.